(12) United States Patent
Hörlin

(10) Patent No.: US 6,212,162 B1
(45) Date of Patent: Apr. 3, 2001

(54) ARRANGEMENT AND METHOD RELATING TO PACKET FLOW CONTROL

(75) Inventor: Dan Hörlin, Enskede (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/073,821

(22) Filed: May 7, 1998

Related U.S. Application Data

(63) Continuation of application No. PCT/SE96/01413, filed on Nov. 4, 1996.

(30) Foreign Application Priority Data

Nov. 9, 1995 (SE) .................................................. 9503967

(51) Int. Cl.[7] .................................................. H04J 3/14
(52) U.S. Cl. ........................................ 370/229; 370/468
(58) Field of Search .................................. 370/412, 414, 370/415, 416, 417, 418, 229, 230–231, 232, 236, 468, 395, 398

(56) References Cited

U.S. PATENT DOCUMENTS

| | | |
|---|---|---|
| 5,150,358 | 9/1992 | Punj et al. . |
| 5,153,877 | 10/1992 | Esaki et al. . |
| 5,274,841 * | 12/1993 | Natarajan et al. .................... 370/337 |
| 5,408,465 * | 4/1995 | Gusella et al. ........................ 370/231 |
| 5,457,687 | 10/1995 | Newman . |
| 5,463,616 * | 10/1995 | Kruse et al. .......................... 370/468 |
| 5,491,691 * | 2/1996 | Shtayer et al. ....................... 370/395 |
| 5,790,522 * | 8/1998 | Fichou et al. ........................ 370/468 |

FOREIGN PATENT DOCUMENTS

| | | |
|---|---|---|
| 0 596 624 | 10/1993 | (EP) . |
| 0 678 997 | 10/1995 | (EP) . |
| 92/19060 | 10/1992 | (WO) . |

* cited by examiner

Primary Examiner—Chi H. Pham
Assistant Examiner—Maikhanh Tran
(74) Attorney, Agent, or Firm—Burns, Doane, Swecker & Mathis, L.L.P.

(57) ABSTRACT

An arrangement and a method control the flow of signals including a number of information packets in a communications network, e.g. an ATM-network. The arrangement includes a device for separating the signals in the first traffic signals and second traffic signals. The first traffic signals are signals that have a higher proportion of guaranteed resources, i.e. bandwidth, than the second traffic signals. The first traffic signals are also given a lower priority than the second traffic signals. The first and second traffic signals are handled separately.

30 Claims, 3 Drawing Sheets

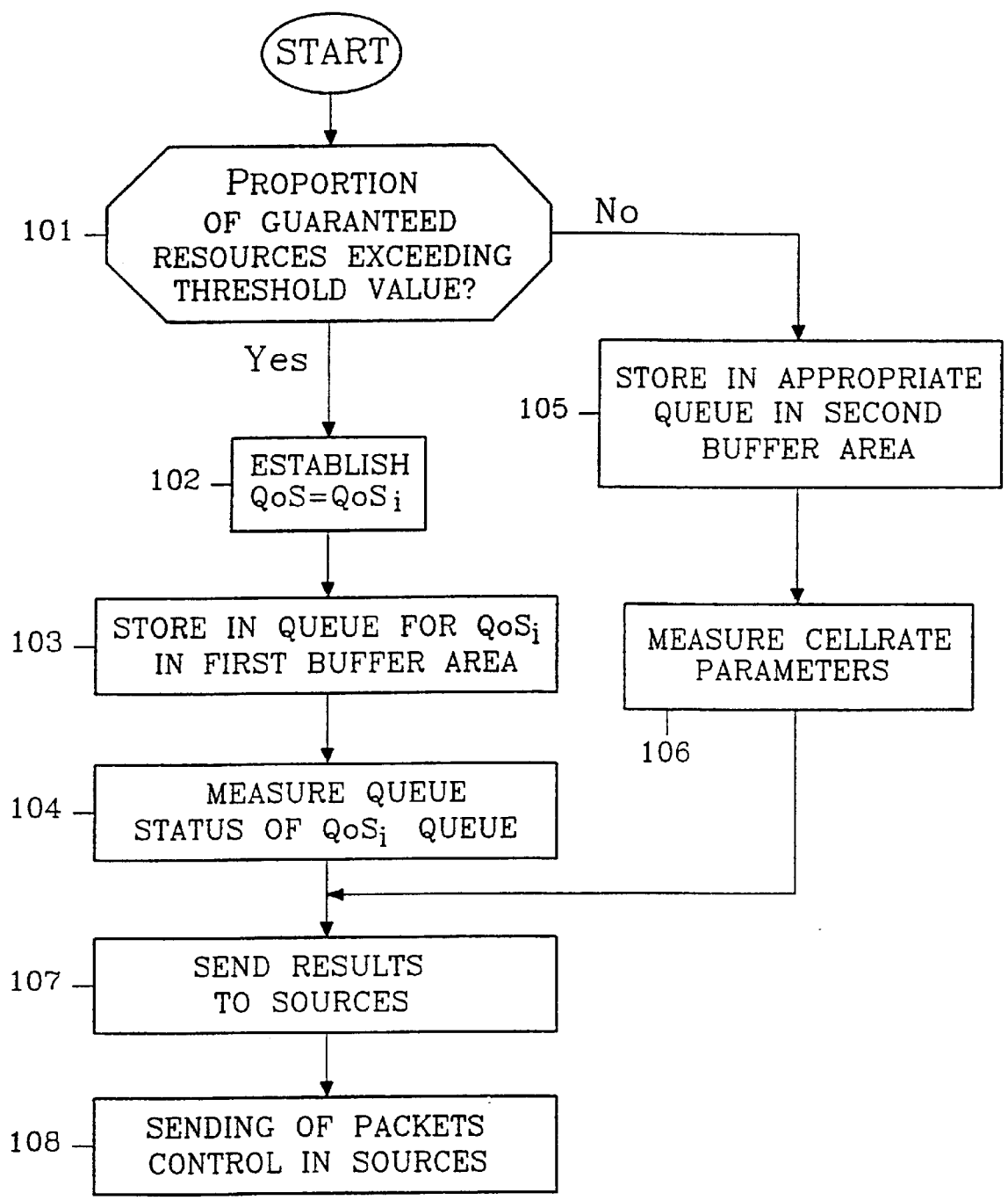

ARRANGEMENT AND METHOD RELATING TO PACKET FLOW CONTROL

This application is a continuation of International Application No. PCT/SE96/01413, which was filed on Nov. 4, 1996, which designated the United States, and which is expressly incorporated here by reference.

BACKGROUND

The present invention relates to an arrangement for controlling the flow of signals comprising a number of information packets in a communications network.

The invention also relates to a method of controlling the flow of signals in the form of information packets.

More particularly the invention relates to controlling the flow of information incoming to concentrating arrangements and rost particularly to switching arrangements in communications systems.

In digital communications systems of today the information is divided into packets. Each packet comprises a header and a data field. The header is the preamble of the packet and contains information about destination address, sometimes also originating address and control bits whereas the data part comprises the information intended for the given address. A cell is a short packet having a predetermined number of bits, i.e. a packet of a fixed length. Via switching arrangements in the communications network packets or cells are routed from various sources to destinations as given by the address information of the packets via packet switching arrangements. Switching arrangement which operate in so called synchronous transfer mode (STM) are known as well as other switching arrangements operating in asynchronous transfer mode (ATM). Some switching arrangements may also operate in both modes.

The ATM switching technique is a so called fast packet switching technique. This switching technique is particularly applicable when different sources have different requirements as to bandwidth. Via ATM different or mixed traffic streams such as for example data, voice, video or images can be transmitted asynchronously which is clearly advantageous in modern communication systems wherein one or more kinds of information may need to be transmitted.

In ATM, information is transported in the form of cells, i.e. packets of a fixed length. It is of great importance to the network how the packet switches operate. A number of cells may for instance arrive at a switch on a number of different input links at the same time and a number of them may have the same output link destination or there may be a discrepancy between the number of input links and the number of output links wherein the number of output links is considerably lower than the number of input links. This means that a number incoming cells may have to compete for an output link. The output link, however, cannot handle more than one cell at a time meaning that the other cells have to be stored temporarily in a buffer. This puts high demands on the buffering capacity and in some cases the capacity may not be sufficient and the cells may even run the risk-of being completely lost. It may also be difficult to fulfil the requirements as to waiting time etc.

Various buffering arrangements or buffering methods have been provided using input buffers, output buffers or a combination of both. One aspect relates to the head of the line problem (HOL). This is a problem that may occur when a number of data cells are stored in an input buffer which is a waiting position, i.e. the first cell in the buffer is waiting to be served. Then all data cells contained in that buffer have to wait, also those cells further down in the queue which are destined for other output links which for example at that moment might not be loaded at all. This means that neither the packet switch nor the output links are used to their full capacity but even very poorly. To solve these problems output buffers have been provided as well as intermediate buffers in a switch core etc. However, this may put high requirements on the output buffers and if there are a number of buffers at different locations, e.g. input buffers, intermediate buffers, output buffers etc. the switch gets very complicated. The copending patent application "Arrangement and method relating to packet switching" by the same applicant and filed at the same date as the present application discloses a way how to solve these problems and it is incorporated herein by reference.

It may also be required that different qualities of service, different QoS, are handled by the network. The switching arrangements as described in the above mentioned reference also deals with this.

There are different categories of signals one of which is CBR (constant bit rate). This category puts high requirements on the network and requires reservation of the needed bandwidth. This means that a network must have a high capacity for such signals since there are not accepted any variations in delay or delays as such at all. CBR signals are generally used for telephony and video signals. In U.S. Pat. No. 5,150,358 a system is given separating CBR signals from the others and handling them separately and giving them a higher priority. The CBR service class is however "homogenous" why the same problems are not encountered as when a service class is not homogenous.

Another category relates to signals of variable bit rate, VBR, which for example can be used for video. This relate to traffic streams having a guaranteed bandwidth but wherein the requirements as to delay variations are less strict.

A third category relates to ABR signals wherein ABR means available bit rate. The demands as to variations in delay are low or even none at all for these signals. What is important is that no cells are lost. The signals are e.g. used for data communication. There is today still no standardization relating to ATM ABR but such is expected to be produced soon. One controlling method based on cellrate measurements has been suggested. This means that switching arrangements in a network receiving ATM ABR signals may calculate a value on an adequate cellrate and feeding this information back to the sources of the signals. A source here means either a network terminating equipment or equipment within the network forming terminating equipment only as far as the flow control is concerned. However, since the method is based on measuring and feeding back of cellrate parameters, it works poorly when the cellrate is close to saturation. This means that links, for example expensive links, e.g. are not used fully or to an acceptable degree.

In WO 92/19060 an ATM switching arrangement is disclosed. Cells are divided into low loss and low delay cells respectively and the switching arrangement comprises a cell buffer which is divided into one memory area for each of the two types of cells. Depending on what kind of cell it is and on the buffer fullness, the cells are given different priorities for reading in and reading out respectively. Such an arrangement could however not in a satisfactory way deal with ABR signals.

U.S. Pat. No. 5,153,877 relates to allocation of the resources in a packet network. The resources are subdivided into subresources which are to be allocated to communications divided into different classes depending on QoS such as packet lossrate and transmission dElay. Also this document does not deal with resource allocation for ABR signals.

ABR signals for instance are particularly difficult to handle since irrespective of being of one and the same QoS, they can be of different categories such as being guaranteed resources to different extents. There may thus be a variation between not being guaranteed any resources at all up to being guaranteed resources to a considerable or a significant extent.

SUMMARY

What is needed is therefore an arrangement through which links in a communication network can be used in an optimal way. An arrangement is particularly needed through which the output links of a concentrating or switching arrangement can be used to a desired degree, for example be used maximally or at least more efficiently than in hitherto existing systems. An arrangement is also needed through which the flow control of ATM signals can be done in an easy and reliable way while fulfilling different requirements of different signals.

Even more particularly an arrangement is needed through which incoming signals in a fast switching network which, even if they are within the same service class, are of different categories or of different types can be handled in a satisfactory way so that said signals are sent on to their respective destination without causing congestion and which still operates satisfactorily when the cellrate is close to saturation.

Moreover a method is needed through which the flow of signals in the form of information packets can be controlled in such a way that links, particularly output links from concentrating, e.g. switching arrangements or expensive links, can be used optimally. A method is also needed through which ATM signals of different QoS or of different types within one and the same QoS can be switched through the network in a way which is adequate for the respective signals while still meeting their respective requirements. A flow controlling arrangement is further also needed through which the flow control can be implemented in a simple and non-expensive way without considerably affecting the concentrating/switching arrangements or maybe even without affecting them at all.

Therefore an arrangement is provided which comprises means for separating traffic signals at least into those having a higher proportion of guaranteed resources and those having a lower proportion of guaranteed resources. The arrangement furthermore comprises means for separately handling signals of the first and second kind respectively. Particularly the traffic signals of the first mentioned kind have a higher proportion of guaranteed bandwidth than the signals of the second kind. Particularly the first mentioned signals are given a lower priority than the signals having a lower proportion of guaranteed resources or particularly bandwidth. The traffic signals particularly relate to signals having a lower proportion of cells that are guaranteed resources e.g. in the form of bandwidth which then are given a higher priority. The arrangement comprises a buffering unit in which packets can be arranged in at least one queue. Particularly there are a number of different queues, each for a particular QoS for signals having different QoS. The buffering unit particularly comprises a first buffering area wherein low priority packets can be stored in at least one queue. Particularly, cells or packets of the same QoS, e.g. ABR cells which have a high proportion of guaranteed bandwidth are stored in the queue in the first buffering area whereas the ABR cells having a lower proportion of guaranteed bandwidth are stored in the second area of the buffering unit.

Advantageously the packets or cells may be arranged in the buffering unit both depending on QoS and on proportion of guaranteed bandwidth.

In an advantageous embodiment monitoring means are provided for measuring the cellrate of signals not being guaranteed a significant proportion of resources or bandwidth whereas monitoring means also are provided for monitoring the queue status in the buffer area of signals having a low priority which thus provides first and second flow control signals which are provided to the sources for controlling purposes.

If the signals are fed back to the real source, a source end system (SES), the signals are converted to ABR Explicit Rate parameters and used for modification of resource management cells (RM) which always are fed back with a given frequency for every connection. ABR Explicit Rate parameters relate to an estimation by the concentrating arrangement relating to what sending cellrate can be accepted and they are provided to the sources via the resource management cells. If the feedback signals are sent to a virtual source end system (VSES) within the network itself, no conversion is required but the signals may contain information based on credit flow results according to e.g. a protocol as defined by the network.

Advantageously a rate flow controlling method (taking the available bandwidth into account) is combined with a cell credit flow control method, cell credit control here relates to storing in the buffering unit irrespectively of whether particular cell credit parameters are used or cellrate parameters of the other method.

In an advantageous embodiment the arrangement is implemented at the input unit of a switch core. In a most advantageous embodiment the switching arrangement has the features of the arrangement as described in the simultaneously filed patent application by the same applicant which was referred to above.

The invention is applicable to arrangements in general wherein a concentration occurs e.g. requiring any kind of buffering arrangement. The arrangement may comprise a virtual flow controlling element of the network, element in this case relating to a segment as defined in relation to ATM ABR signals. The arrangement in a particular embodiment relates to signals having different proportions of guaranteed resources or bandwidth irrespectively of whether they belong to different QoS or whether there are different types of signals of the same QoS, as e.g. ABR signals which as such can be of different types.

Moreover, depending on the proportion of guaranteed resources, signals may be handled in more than two different ways, for example there may be separate buffers for one or two or even more of the types of signals i.e. depending on their proportion of guaranteed resources particularly of the same QoS. To summarize this means that the signals more or less sensitive to being stored temporarily, are stored in one buffer area whereas those signals being well capable of being stored to some extent are stored in another area of the buffering means, whereas those signals who are not guaranteed any bandwidth at all or at least substantially no bandwidth, are controlled via an ordinary cellrate flow controlling method. Instead of storing the signals in different areas of one and the same buffer of buffering unit, they may be stored in separate buffers.

Therefore, the invention also provides a switching arrangement for switching information packets incoming to at least one inlet unit on a number of input links, through a switch core on to a number of output links which comprises means for separation of incoming traffic signals into at least first and second traffic signals wherein the first traffic signals comprises a higher proportion of packets guaranteed resources than the second traffic signals. Flow control of at least one of said first or second traffic signals is handled separately from the Other traffic signals. Advantageously the first and second traffic streams of signals respectively are not only handled separately but also differently. Advantageously the first traffic signals are handled using a cell credit flow control method, i.e. the cells are temporarily stored in a buffering unit separately from said second signals until they can be switched whereas the second traffic stream is handled using a cellrate flow control method.

The invention therefore also provides a method of controlling the flow of signals in the form of cells incoming on a number of input links to a concentrating arrangement such as e.g. a switching arrangement or a multiplexing arrangement etc. according to which these signals are at least separated into those signals having a proportion of guaranteed bandwidth which exceeds a given threshold value from the rest of the signals, and handling the flow of these signals separately from said other signals. Advantageously those signals having a proportion of guaranteed bandwidth or resources being smaller than the threshold value, are given a higher priority. Cellrate measurements may then be undertaken relating to these signals whereas information on buffering status of the non-prioritized cells is fed back to the sources for flow controlling purposes, i.e. to instruct the sources on how to adjust the sending frequency etc. Sources may here mean either a real source and system or a virtual source end system.

It is an advantage of the invention that links in a network, particularly output links from switching arrangements, which for example may be expensive can be more fully used.

Another advantage is that this can be achieved without requiring advanced and costly modifications of concentrating arrangements in general or switching arrangements in particular.

BRIEF DESCRIPTION OF THE DRAWINGS

The invention will in the following be further described in a non-limiting way under reference to the accompanying drawings in which:

FIG. 4 illustrates a schematical flow diagram on the handling of incoming signals.

DETAILED DESCRIPTION

If a part of incoming traffic signals comprises signals which are guaranteed resources or bandwidth to a proportion exceed a given threshold value, these are separated from the other signals. These traffic signals, which in the following are denoted first traffic signals, are given resources in the form of separate queue handling. Feedback signals concerning buffering unit sizes and control flow delays etc. are used in order to enable saturation of the links, i.e. filling of the links without causing congestion since the flow through is guaranteed to the first traffic signals. According to different embodiments flow controlling arrangements can e.g. be implemented in network nodes such as switching arrangements multiplexers etc. but flow controlling arrangements can also be implemented elsewhere in the network. Below an embodiment relating to the implementation of a flow controlling arrangement in a switching arrangement or in association with a switching arrangement will be described under reference to FIG. 2.

Figure 1:
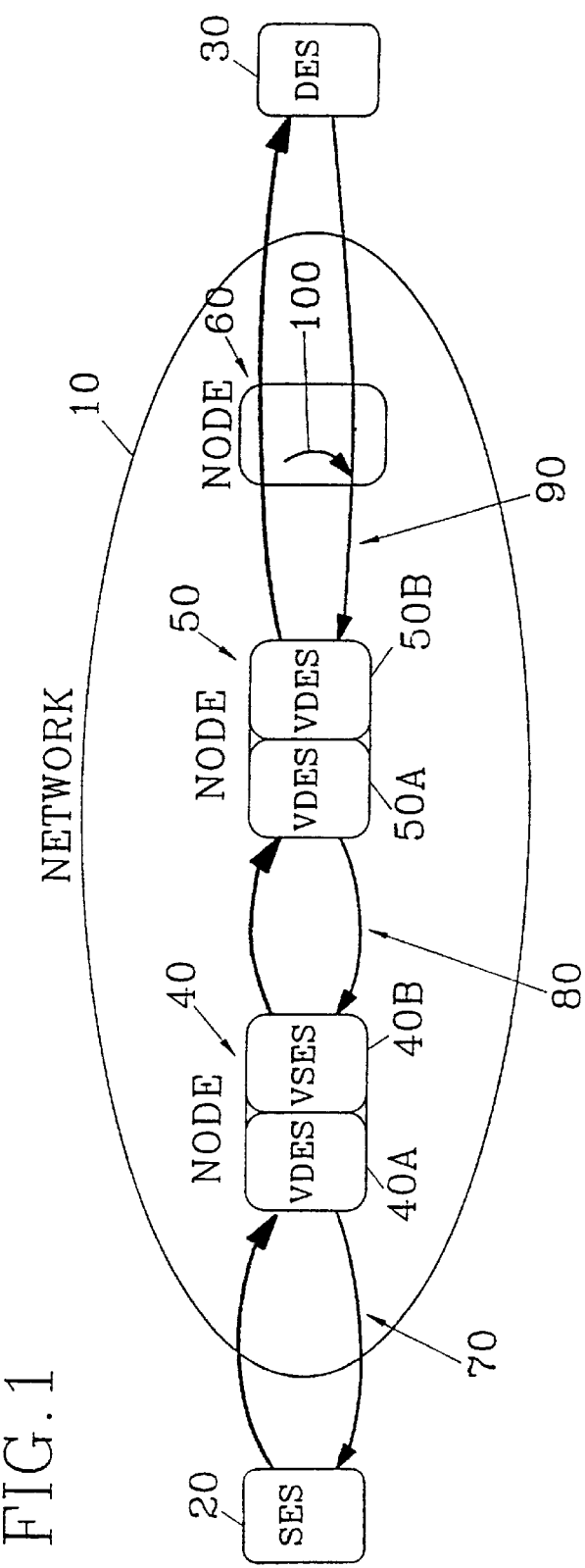
FIG. 1 is a schematical illustration of flow control according to the invention.

FIG. 1 illustrates a system comprising a network 10, a source end system SES 20 and a destination end system DES 30. The network comprises a number of nodes 40,50,60. Two of the nodes 40,50 each comprise a virtual destination end system VDES 40A;50A and a virtual source end system VSES 40B;50B. The third node 60 is an ordinary node such as a switch or a multiplexer. Generally the invention can be implemented in a concentrating arrangement or similar (switching arrangement, multiplexer, etc.) needing a buffer or similar, c.f. node 60 which will be more thoroughly explained under reference to FIGS. 2 and 3 or it can be implemented as control purpose elements; c.f. nodes 40,50 in FIG. 1.

From the VDES 40A of node 40 control signals are fed back via an ABR flow control feedback loop 70. When signals relating to measurement results, cellrate measurements and/or feedback measurements on the first and second signals respectively, are fed back to the real source, a source end system SES 20, they must be expressed in terms of cellrate or ABR Explicit Cellrate as will be further illustrated under reference to FIG. 3. Only if signals are fed back to a virtual source end system (within the network) they may comprise credit based information according to a protocol defined by the networks.

Credit based flow control (cell credit flow control) here means that the calculation of feedback signals is done taking into account the buffering capacity that is required in order to be able to handle the flow according to the ABR controlling algorithm and line delays even if no positive feedback has taken place.

Cellrate flow control here comprises a calculation of the feedback signal in relation to the available bandwidth. In both cases a value on acceptable rate is fed back (e.g. in agreement with the ATM ABR specifications).

However, the internal flow control loops 80,90 are specified for the particular network. The loop parameters may e.g. directly give the available buffer space. This is however non-transparent in the network interface.

The ordinary node 60 which as already referred to above e.g. can be switch or a multiplexer does not have to close or complete the control loop itself. The control parameters describing the results of the measurements are included into resource management cells RM. Such RM cells are generally included in every connection in a regular manner. Such resource management cells RM are generated by the source, SES or VSES. The destination systems, DES or VDES, always return the RM cells via feedback loops to the source (SES or VSES).

An ordinary node 60 may alternatively close the loop by including, as indicated by 100, RM cells in the feedback loop 90. This is e.g. a way of accelerating the feeding back of signals and thus to speed up the procedure.

Figure 2:
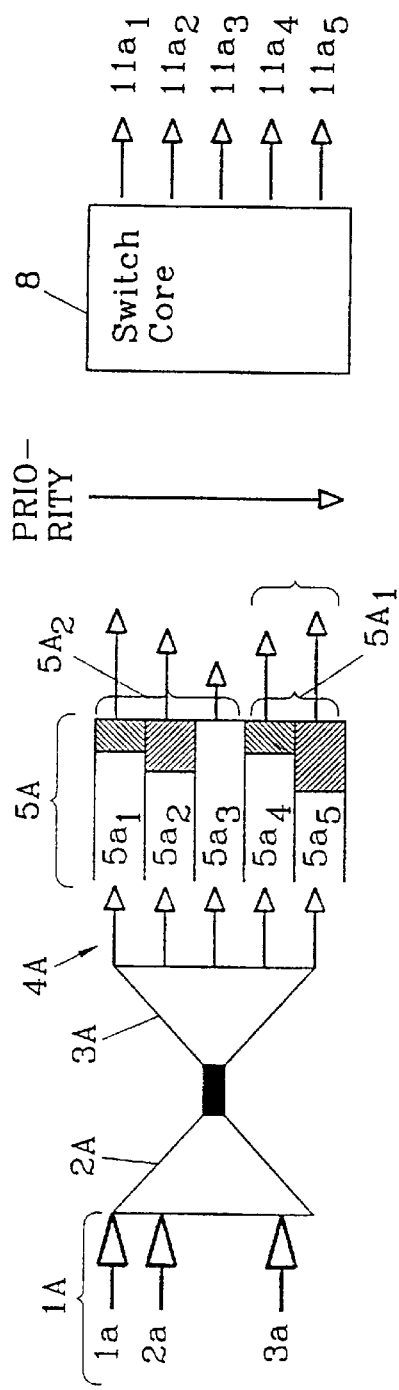
FIG. 2 is a schematical illustration of a first embodiment of the invention as implemented in a switch.

In FIG. 2 an implementation relating to a switching arrangement is illustrated. Signals from a number of sources, here merely denoted S, which is intended to mean a number of different sources are coming in on a number of input links 1a, 2a, 3a (1A) to a multiplexing device 2A in which they are concentrated or multiplexed. In the demultiplexer 3A the traffic streams or the traffic signals are arranged at least depending on QoS. It should however be clear that it is not necessary for the functioning of the present invention that a separation depending on QoS is done but this merely relates to a particular embodiment. What is important for the present invention is that a separation is done for signals having different proportions of guaranteed resources, either into two groups or into more groups. They may additionally be divided depending on addressed output port or according to other criteria. According to the present invention traffic streams having a significant amount of guaranteed bandwidth are separated from the other traffic streams. This means that a queue separation per connection/communication is not necessary which would give a complicated queue handling which also is expensive to implement. However, the traffic signals are separated into traffic signals which to a significant proportion, or degree, are guaranteed bandwidth, called first traffic signals, and second traffic signals which do not comprise traffic signals which to a significant extent are guaranteed bandwidth. A buffering unit 5A is provided which comprises two different buffering areas; the first buffering area $5A_1$, for example for ABR signals having a significant proportion of guaranteed bandwidth which then e.g. are stored in queues $5a_4$, $5a_5$ and the second buffering area $5A_2$ for signals not having a high proportion of guaranteed bandwidth or more generally second signals as defined above.

The highest priority is e.g. given to CBR signals (if such are present), constant bit rate signals which are very sensitive to buffering which thus for example may be stored in queue $5a_1$. The second queue $5a_2$ is for example used for VBR signals i.e. variable bit rate signals which are somewhat less sensitive to buffering. Of course this is just an example, in many cases there may not even be any VBR (or CBR) signals, these are merely included for exemplifying reasons. The third queue $5a_3$ is used for signals not being guaranteed bandwidth to any significant proportion, such as ABR signals or more generally second signals as defined above. $5a_4$, $5a_5$ denote queues of the first area $5A_1$ intended for ABR signals or other signals which are guaranteed bandwidth and which can be stored but for which no cells or substantially no cells should be lost. Measuring means are further provided, (not further illustrated in this figure since their functioning should be known per se) for measuring the cellrate of the second signals in a manner known per se and for measuring the queue status of the second signals or low priority signals which also can be done in different ways in some known manner. The results of these measurements are then fed back to the sources so that they can control their sending of cells correspondingly. It should however be noted that the data resulting from the measurements, i.e. the results, have to be converted into ABR Explicit Rate parameters before feeding back if fed back to a real source end system SES as discussed above under reference to FIG. 1. According to the priorities the signals are then switched through the switch core 8 in a manner known per se and output on the destination output links $11a_1$–$11a_4$ also in any manner known per se.

The arrangements as described above are intended to use the available bandwidth to the greatest possible extent and at the same time use the buffering areas to a certain extent for that part of the traffic streams which can be queued in order to get hold of the remaining bandwidth which otherwise could not be fully exploited. This means that output links of the switching arrangement can be more efficiently used, leaving in practice none or very little capacity unused. An arrangement according to the present invention gets more efficient the higher the proportion of traffic having a guaranteed bandwidth.

Generally, by separating the traffic streams into a first and a second traffic stream (or first and second traffic signals), the composition of communications get more homogenous so that the level of acceptance as to storing in queues is more similar within the respective streams. By separating those connections which are not, or only to a very low extent, affected by being queued, a queue of an adequate size can be formed for using the last available bandwidth of e.g. an expensive output link.

The flow controlling arrangement of the invention combines cellrate flow controlling with cell credit flow controlling.

Figure 3:
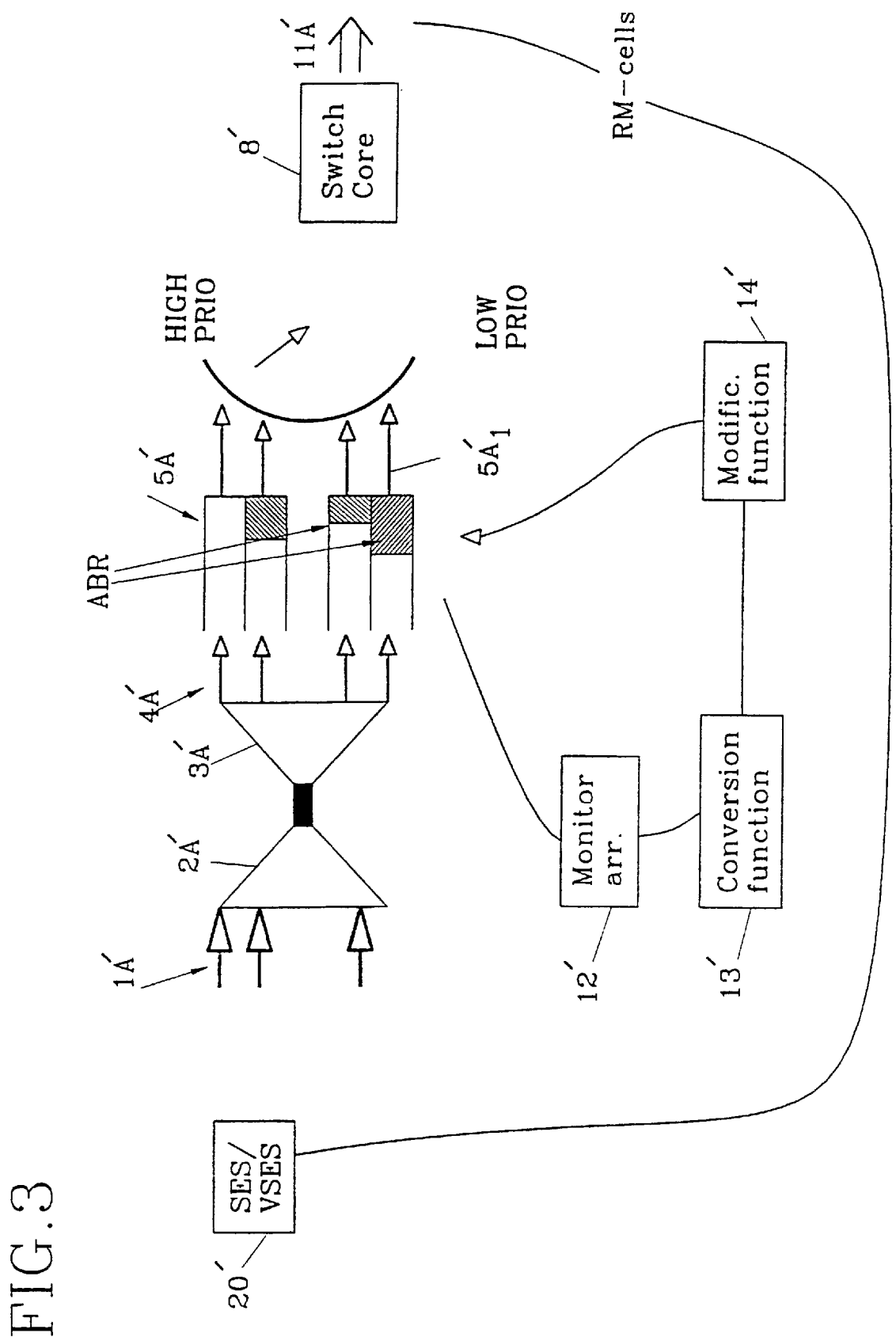
FIG. 3 illustrates more in detail the transmission of signals in the arrangement of FIG. 2.

FIG. 3 illustrates in a more detailed manner the transmission of data and the feedback flow control signals.

FIG. 3 in principle corresponds to FIG. 2. The more detailed explanation of buffering alternatives, multiplexing/demultiplexing arrangements is therefore omitted. Although a switch core 8' is illustrated (like the switch core 8 of FIG. 2) it should be clear that it does not have to be a switch core. It can be any kind of signal concentrating arrangement which motivates the use of some buffering arrangement comprising separation e.g. into different QoS.

Like in FIG. 2 a concentration of signals on a number of input links 1A' is done in a multiplexing arrangement 2A'. The streams of signals are in the demultiplexing arrangement 3A' separated into different groups depending on QoS and stored in queues in the buffering arrangement 5A' e.g. as described under reference to FIG. 2. Through monitoring arrangement 12' cellrate measurements and queue status measurements are undertaken. Since the signal source in this case is a source end system SES 20' the queue status results are converted in conversion arrangement 13' into ABR Explicit Rate parameters and used in the modification arrangement for modification of resource management cells RM. These are by the destination terminal (not illustrated in the figure) via a feedback loop sent to the originating terminal, i.e. SES 20'.

In one particular advantageous embodiment the switching arrangement can take the form of a switching arrangement as described in the above cited patent application which is incorporated herein by reference. The switch core 8; 8' then comprises a number (two or more) of inlet units and a number outlet units wherein to each inlet unit a main buffer unit 5A,5A' is provided which in this case also comprises the functionality as described above.

FIG. 4 is schematical flow diagram. For an incoming signal the proportion of guaranteed resources is examined 101. If it exceeds a given threshold value, the QoS, is established 102 and the cell is stored in the appropriate queue in the first buffer area 103. Then the queue status of the queue $QoS_1$ is measured 104 and the result is fed back to the sending sources 107 in which the sending of cells is controlled accordingly 108 e.g. the sending rate can be increased, decreased or kept at the same level. As discussed in the foregoing, a conversion has to be done if the result is fed back to a real end source. If on the other hand it is established that the proportion of guaranteed resources does not exceed the threshold value, these signals are given a higher priority and the cells are stored in the appropriate queue in the second buffer area 105 or not stored at all, The cellrate parameters of the cellrate are measured 106 and the results are also sent to the sources 107 via a the feedback loop for controlling purposes in the sources 108.

Of course no storing is carried out unless needed since the intention is to use the links in the network, e.g. particularly output links from e.g. a switch core associated with the flow control arrangement or located after said arrangement as effectively as possible.

Many variations are possible within the scope of the invention. For example the arranging or combination of flow controlling arrangements in a network, either as separate or implemented at the input part or inlet unit of a switching arrangement. The invention also applies likewise to any QoS or any service classes as ABR etc., irrespectively of whether the cells are within the same service class, such as ABR, or in different classes as far as the proportion of guaranteed resources is concerned. It is also possible to divide the cells into more than those two groups corresponding to those having a significant proportion guaranteed bandwidth and those who do not, such as for example into more groups for which different threshold values are given etc.

What is claimed is:

1. An arrangement for controlling the flow of signals comprising a number of information packets in a communications network, said arrangement comprising
    means for separating the signals in at least first traffic signals and second traffic signals, wherein the first traffic signals are signals having a higher proportion of guaranteed resources than the second traffic signals,
    means for handling the flow control of at least one of the first and second traffic signals separately from the flow control of the other traffic signal(s), wherein the first traffic signals are given a lower priority than the second traffic signals, and
    means for monitoring the cellrate of said second signals.

2. The arrangement of claim 1, wherein the first traffic signals are signals having a significant proportion of guaranteed bandwidth.

3. The arrangement of claim 1, wherein a traffic stream comprising traffic signals having a lower proportion of packets that are guaranteed resources have a higher priority.

4. The arrangement of claim 3, further comprising a buffering arrangement in which packets can be arranged in at least one queue.

5. The arrangement of claim 4, wherein the buffering arrangement at least comprises a first buffering area in which low priority packets can be stored.

6. The arrangement of claim 5, wherein packets originating from terminals having different QoS are arranged in a number of different queues, at least depending on QoS, in the buffering arrangement.

7. The arrangement of claim 6, wherein a queue arranging means arranges the packets of the traffic streams in the buffering arrangement depending on at least QoS and on proportion of guaranteed bandwidth and wherein packets can be arranged in different buffering areas even if they have the same QoS.

8. The arrangement of claim 4, further comprising monitoring means for measuring the cellrate of signals having a high priority and
    means for monitoring the queue status in buffer areas for signals having a lower priority, thus providing first and second flow control signals to be used for flow controlling purposes.

9. The arrangement of claim 1, wherein cell credit flow control is combined with cellrate flow control for maximizing the use of link capacity without causing link congestion.

10. The arrangement of claim 6, wherein the buffering arrangement and the queue arranging means are implemented at the input unit and the corresponding input buffering means of a switch core.

11. The arrangement of claim 1, wherein the signals comprise asynchronous transfer mode (ATM) cells, the arrangement thus operating in ATM-mode.

12. The arrangement of claim 11, wherein at least some of the signals are available bit rate (ABR) signals.

13. The arrangement of claim 1, further comprising a virtual flow controlling element arranged internally in a network comprising a virtual source end system and a virtual destination end system.

14. A switching arrangement for switching information packets incoming to at least one inlet unit on a number of input links through a switch core on to a number of output links, said arrangement comprising:
    means for separating incoming packets into at least a first and second traffic stream, wherein the first traffic stream comprises a higher proportion of packets guaranteed resources than the second traffic stream, the flow control of at least one of said traffic streams being handled separately from the other traffic stream(s), the packets of said first traffic stream are given a lower priority than the second traffic signals, and
    means for monitoring the cellrate of said second traffic stream.

15. The arrangement of claim 14, wherein the first traffic stream comprises signals having a significant proportion of guaranteed bandwidth.

16. The arrangement of claim 14, wherein traffic streams comprising signals having a higher proportion of packets that are guaranteed resources have a lower priority whereas the traffic stream having the lowest proportion packets guaranteed bandwidth is given the highest priority.

17. The arrangement of claim 14, wherein the packets incoming from terminals having different QoS are arranged in different queues, at least depending on QoS, in an input buffering unit by queue arranging means, said queue arranging means furthermore arranging the packets of the traffic streams in the buffering arrangement depending on the proportion of guaranteed bandwidth.

18. The arrangement of claim 17, wherein signals of the same QoS are arranged in different queues depending on whether having a significant portion of guaranteed bandwidth or not.

19. The arrangement of claim 18, wherein the buffering handling of said first and second traffic streams is separate and/or different and wherein a first buffering area of the input buffering unit is used for buffering traffic signals having a lower priority.

20. The arrangement of claim 19, wherein first flow control signals relating to cellrate measurement on signals having a high priority and second flow control signals relating to queue status in buffers for signals given a lower priority are provided to the destination arrangement, and they are used for flow controlling purposes with the use of resource management cells sent by said destination arrangement to the sending arrangements.

21. The arrangement of claim 15, wherein it operates in asynchronous transfer mode (ATM) and at least some signals comprise available bit rate (ABR) signals.

22. An arrangement for controlling the flow of information packets in a communications system, comprising:
    means for separating streams of packets having a proportion of packets being guaranteed bandwidth exceeding a given value, thus at least providing first and second traffic streams, means for measuring the cellrate of said second packet streams, buffering means for temporarily storing packets of said first traffic streams separately from said second traffic stream packets, means for measuring the fullness of said buffering means, and means for feeding back the cellrate measurement results and cell credit measurement results relating to buffering fullness to the sending sources/system(s) for controlling the flow, wherein a higher priority is given to said second packets.

23. The arrangement of claim 22, wherein the streams of packets are at least to some extent asynchronous transfer mode (ATM), available bit rate (ABR) signals and wherein the capacity on output links via the controlling is maximally exploited.

24. The arrangement of claim 22, wherein the sending system is a virtual sending end system.

25. The arrangement of claim 23, wherein the sending system is a real source end system, the arrangement further comprising a converting arrangement for converting queue status measurement results into available bit rate (ABR) explicit rate parameters for modifying resource management cells which are fed back to the real source end system.

26. A system for controlling the flow of cells from a source end system to a destination end system through a network comprising a number of real nodes and a number of virtual nodes, wherein at least a number of the nodes comprise(s) means for separating first signals having at least a given proportion of guaranteed bandwidth from second signals having not, buffering means for temporarily storing at least the first signals and monitoring means for measuring the queue status for said first signals and for measuring the cellrate of said second signals and feeding back the results of said measurements to a preceding sending source to control the transmission of signals.

27. A method of controlling the flow of signals in the form of information packets incoming on a number of input links, comprising the steps of:

separating the signals at least into first signals having a proportion of guaranteed bandwidth exceeding a given threshold value from second signals thus providing at least first and second signals respectively, controlling the flow of said first signals separately from said second signals through feeding results about measurements on said first and second signals respectively to sending sources, and giving priority to said second signals having a lower proportion of guaranteed bandwidth.

28. The method of claim 27, further comprising the step of:

storing said first signals separately from said second signals in buffering means for said first signals.

29. The method of claim 28, further comprising the steps of:

carrying out cellrate measurements on said first signals, measuring the buffering status of the queues of the buffering area intended for said first signals, converting the latter results into available bit rate (ABR) explicit rate parameters, and feeding the results back to an originating real end source.

30. The method of claim 27, wherein the signals having different proportions of guaranteed bandwidth are signals of one and the same service class.

* * * * *